US007291435B2

(12) United States Patent
Yamashiro

(10) Patent No.: US 7,291,435 B2
(45) Date of Patent: Nov. 6, 2007

(54) TONER BINDER FOR ELECTROPHOTOGRAPHY AND TONER FOR ELECTROPHOTOGRAPHY

(75) Inventor: Takashi Yamashiro, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 10/508,901

(22) PCT Filed: Mar. 25, 2003

(86) PCT No.: PCT/JP03/03625

§ 371 (c)(1), (2), (4) Date: Apr. 13, 2005

(87) PCT Pub. No.: WO03/081340

PCT Pub. Date: Oct. 2, 2003

(65) Prior Publication Data

US 2005/0176919 A1 Aug. 11, 2005

(30) Foreign Application Priority Data

Mar. 25, 2002 (JP) ............................ 2002-084608

(51) Int. Cl.
*G03G 9/00* (2006.01)
*C08G 63/02* (2006.01)

(52) U.S. Cl. ................................ 430/109.1; 430/110.1; 430/110.4; 430/114; 528/176; 528/190; 528/195; 528/219; 524/430; 524/442

(58) Field of Classification Search ................ 528/176, 528/190, 195, 219; 430/109, 110, 114, 109.1, 430/110.1, 110.4; 524/430, 442
See application file for complete search history.

(56) References Cited

U.S. PATENT DOCUMENTS

| | | | |
|---|---|---|---|
| 4,939,059 A | 7/1990 | Kawabe et al. | |
| 6,077,639 A * | 6/2000 | Semura et al. | 430/109.4 |
| 6,555,611 B2 | 4/2003 | Tachifuji et al. | |

FOREIGN PATENT DOCUMENTS

| | | |
|---|---|---|
| DE | 100 36 647 A1 | 5/2001 |
| EP | 1 347 342 A1 | 9/2003 |
| JP | 3-41045 | 2/1991 |
| JP | 7-271083 | 10/1995 |
| JP | 11-217431 A | 8/1999 |
| JP | 2000-137350 | 5/2000 |
| JP | 2000-172008 | 6/2000 |
| JP | 2000-298374 | 10/2000 |
| JP | 2000-305316 | 11/2000 |
| JP | 2000-347450 | 12/2000 |
| JP | 2001-187337 A | 7/2001 |
| JP | 2001-327862 A | 11/2001 |

OTHER PUBLICATIONS

European Search Report dated Sep. 22, 2006, issued in corresponding European Patent Application No. 03712924.4.

* cited by examiner

*Primary Examiner*—Irina S Zemel
(74) *Attorney, Agent, or Firm*—Westerman, Hattori, Daniels & Adrian, LLP.

(57) ABSTRACT

The present invention provides a toner binder for electrophotography which comprises a polyester resin constituted of an alcohol component containing a polyoxyalkylene ether (A) of a bisphenol and an acid component, and the content of unreacted bisphenols in said polyester resin is 15 ppm or less.

6 Claims, No Drawings

TONER BINDER FOR ELECTROPHOTOGRAPHY AND TONER FOR ELECTROPHOTOGRAPHY

TECHNICAL FIELD

The present invention relates to a toner binder and a toner for electrophotography to be used in electrophotography, electrostatic recording, electrostatic printing and the like.

BACKGROUND ART

A toner binder for electrophotography used for a heat fixing system, which is a fixing system of images commonly applied in copiers, printers and the like, is required to make a toner not fusing to a hot roller even at a high fixing temperature (anti-hot offset property), to be capable of fixing a toner even at a low fixing temperature (low temperature fixability), to have an appropriate impact strength to be used in the form of microparticles, and the like. In order to satisfy these basic required performances, it has been known to use a polyester resin having a constituent unit of an alcoholic compound derived from a bisphenol (for example, refer to U.S. Pat. No. 4,939,059).

In recent years, concerns on durability of copiers and printers using a heat fixing system have been increased. And it has come to be strongly desired to form a stable image even after repeatedly using copiers and the like over a long period of time.

However, when using a conventional toner binder or toner which comprises a polyester resin, there is a problem that long-term running ability is not sufficient.

SUMMARY OF THE INVENTION

The present inventors have conducted intensive investigations to develop a polyester-based toner binder for a heat fixing system excellent in long-term running ability, and as the result, have completed the present invention.

That is, the present invention relates to a toner binder for electrophotography which comprises a polyester resin constituted of an alcohol component containing a polyoxyalkylene ether (A) of a bisphenol and an acid component, the content of unreacted bisphenols in said polyester resin being 15 ppm or less; and a toner for electrophotography which comprises said toner binder, a colorant and, optionally, an additive.

Hereinafter, the present invention is described in detail.

DETAILED DESCRIPTION OF THE INVENTION

As the polyester resin to be used for the toner binder of the present invention, there may be mentioned a polycondensation product of an alcohol component and an acid component, and the like.

As the alcohol component, there may be mentioned a polyoxyalkylene ether (A) of a bisphenol, which is an essential component, and other polyols. As the acid component, there may be mentioned a polycarboxylic acid.

Generally, a polyoxyalkylene ether (A) of a bisphenol can be obtained by adding an alkylene oxide (hereinafter, abbreviated as AO) to a bisphenol.

As the bisphenol, there may be mentioned those represented by the following general formula (1):

$$HO—Ar—X—Ar—OH \quad (1)$$

in the formula, X represents an alkylene group having 1 to 3 carbon atoms, $—SO_2—$, —O—, —S— or a direct bond, Ar represents a phenylene group which can be substituted with a halogen or an alkyl group having 1 to 30 carbon atoms.

Specifically, there may be mentioned, for example, bisphenol A, bisphenol F, bisphenol B, bisphenol AD, bisphenol S, trichlorobisphenol A, tetrachlorobisphenol A, dibromobisphenol F, 2-methyl-bisphenol A, 2,6-dimethyl-bisphenol A, and 2,2'-diethyl-bisphenol F. Two or more of these may also be used in combination.

As a preferred AO to be added to the bisphenol, there may be mentioned those having 2 to 4 carbon atoms. Specifically, there may be mentioned ethylene oxide (hereinafter, abbreviated as EO), propylene oxide (hereinafter, abbreviated as PO), 1,2-,2,3-,1,3- or iso-butylene oxide, tetrahydrofuran (hereinafter, referred to as THF), and combination of two or more of these. Among these, preferred are EO and/or PO. The number of moles of AO added to the bisphenol is preferably 2 to 10 moles, and more preferably 2 to 4 moles.

Among (A), a bisphenol A-EO and/or -PO adduct (average number of moles of AO is 2 to 4, particularly 2 to 3) is preferred in view of toner fixability.

A catalyst is used at the time of addition of the AO to the bisphenol. The catalyst is not particularly restricted, but an alkali catalyst is preferred. As the alkali catalyst, there may be mentioned hydroxides of alkaline metals (for example, lithium, sodium, potassium and cesium), hydroxides of alkaline earth metals (for example, magnesium, calcium and barium), and the like. Preferred among these are potassium hydroxide and cesium hydroxide.

The amount of the catalyst to be used is not particularly restricted, but is preferably 0.0001 to 10%, and more preferably 0.001 to 1% relative to that of the bisphenol.

In the above and the subsequent description, unless otherwise specified, "%" means "weight %", "ratio" means "weight ratio", and "part(s)" means "part(s) by weight".

At the time of addition of the AO, the bisphenol, AO and catalyst may be charged at once to carry out the reaction, or the AO may be added to a mixture after dehydration, if necessary, of the bisphenol and the catalyst to carry out the reaction. Furthermore, it is also allowable that the catalyst and the AO may be added to the bisphenol to carry out the reaction. Among these, preferred is the method in which the AO is added to a mixture of the bisphenol and the catalyst to carry out the reaction.

The reaction temperature at the time of addition of the AO to the bisphenol is preferably 0 to 250° C., more preferably 20 to 180° C., particularly preferably 80 to 150° C., and most preferably 85 to 120° C. The pressure in the reaction system is preferably −0.5 to 6 kgf/cm$^2$G, more preferably 0.2 to 5 kgf/cm$^2$G. For example, there may be mentioned a method, which comprises carrying out maturity of the reaction system until the pressure in the reaction system reaches equilibrium at the above temperature after completion of charging a predetermined amount of AO.

The reaction may be carried out in the presence of one or more solvents, if necessary. When a solvent is used, the solvent is removed by stripping under reduced pressure or the like after completion of the reaction. As the solvent, there may be mentioned, for example, water, alcohols (methanol, ethanol and the like), ketones (acetone and the like), ethers (THF and the like) and aromatic hydrocarbons (xylene and the like).

The content of unreacted bisphenols in (A) is preferably 15 ppm or less, more preferably 5 ppm or less, particularly preferably 1 ppm or less, and most preferably the detection limit (0.1 ppm) or less. If it is 15 ppm or less, the toner binder of the present invention containing 15 ppm or less of unreacted bisphenols in the polyester resin can be easily obtained, thus long-term running ability becomes improved when used as a toner.

In the present invention, the content of unreacted bisphenols is determined by the following method.

[The Measuring Method of the Content of Bisphenols]

3 g of a sample is weighed precisely and dissolved in 30 ml of chloroform, and 30 ml of 0.5 mol/L KOH is mixed in the solution. After separating the mixture into two layers, the aqueous layer is removed and the pH of the aqueous layer is adjusted to 3 or less by adding hydrochloric acid. Further, 30 ml of chloroform is added thereto and mixed and the mixture is separated into two layers. Then, the chloroform layer is removed and mixed with a small amount of sodium sulfate anhydrate, and separated by decantation. The chloroform layer is placed in a reduced pressure condition to strip chloroform, and the residue after stripping is dissolved by adding 3 ml of acetonitrile. This solution is measured by liquid chromatography analysis (LC analysis). A calibration curve of concentration to area of each bisphenol is prepared in advance, and after measuring the area by LC, concentrations of bisphenols are determined by using the calibration curve.

One example of LC analysis is as follows.

| | |
|---|---|
| LC system: | LC-6A (product of Shimadzu Corp.) |
| Column: | ASAHIPAK GS-310 (7.5 mmϕ × 500 mm) |
| Eluent: | Acetonitrile/water = 40/60 (vol %) |
| Flow rate: | 1.5 ml/min |
| Detector: | SPD-10AVvp (product of Shimadzu Corp.) |
| Detection wavelength: | 230 nm |
| Injection amount: | 20 μl |

When an alkali catalyst is used for obtaining the polyoxyalkylene ether (A), a method is usually used, which comprises adsorbing the catalyst to adsorbents such as activated clay, and separating a polymerized product and the alkali catalyst by a general filtration operation, if a removal of the alkali catalyst is needed. On this occasion, it is also possible to shorten the time required for filtration operation by using a diatom earth filter aid (e.g. "Radiolite", product of Showa Chemical Industry Co., Ltd, and the like) as a filter aid, if necessary.

However, when the AO adduct and the above catalyst are separated by a general filtration operation alone, bisphenols are hardly removed. In those cases, the content of unreacted bisphenols in the AO adduct is generally 20 ppm to 5%, although it may change depending on the species of the bisphenols.

A method for obtaining the polyoxyalkylene ether (A) of a bisphenol having lower content of unreacted bisphenols as mentioned above is not particularly restricted, but for example, there may be mentioned the following purification method (1) or (2). These methods may be conducted repeatedly, or (1) and (2) may be conducted in combination.

(1) A method comprising mixing a polyoxyalkylene ether of a bisphenol, an oxide and/or hydroxide (B) of at least one species of metals selected from the group consisting of aluminum, alkaline earth metals and alkaline metals, and water, and then filtering a solid matter to remove unreacted bisphenols.

(2) A method comprising alkalizing a polyoxyalkylene ether of a bisphenol in a mixed solvent of an organic solvent and water, standing the resultant mixture at 5 to 40° C., and removing unreacted bisphenols by extracting with a solvent in separation of the mixture.

As (B), in the case of the method (1), there may be mentioned hydrotalcite, a silicate, and a metal oxide and/or a metal hydroxide other than these. Two or more of these may also be used in combination.

As the hydrotalcite, there may be mentioned, for example, $Mg_6Al_2(OH)_{16}CO_3.4H_2O$, $Mg_{4.5}Al_2(OH)_{13}CO_3.3.5H_2O$ and the like.

These are minerals produced naturally or compounds obtained synthetically, and are known substances disclosed in West Germany Examined Patent Publication No. 1592126, European Unexamined Patent Publication No. 0207811, and the like. The ratio of $Mg^{2+}/Al^{3+}$ of these natural or synthetic hydrotalcite may vary and is about 1 to 8, and also the ratio of $OH^-/CO_3^{2-}$ may vary and is about 10 to 20.

As the silicate, there may be mentioned, for example, $2MgO.6SiO_2.xH_2O$ and $Al_2O_3.9SiO_2.xH_2O$.

As the oxide and/or hydroxide of at least one species of metals selected from the group consisting of aluminum, alkaline earth metals and alkaline metals other than the hydrotalcite and the silicate, there may be mentioned, for example, $Al_2O_3.xH_2O$, $2.5MgO.Al_2O_3.xH_2O$, $Al_2O_3.Na_2O.2CO_3.xH_2O$ and $Mg_{0.7}Al_{0.3}O_{1.15}$.

Preferred among these are the hydrotalcite and/or the silicate, more preferred are those comprising the hydrotalcite as at least part of (B) (preferably 20% or more, particularly preferably 30 to 95% of (B)), and particularly preferred are those comprising $Mg_6Al_2(OH)_{16}CO_3.4H_2O$ as at least part of (B).

The amount of (B) and water may vary depending on the species of (B), but in view of removal efficiency of unreacted bisphenols and production costs, both are preferably 0.1 to 5 parts relative to 100 parts of (A). The amount of (B) and water are both more preferably 0.2 to 4 parts, and particularly preferably 0.3 to 3 parts. Additionally, the ratio between (b) and water is preferably (1 to 9):(9 to 1), more preferably (3 to 7):(7 to 3), and particularly preferably (4 to 6):(6 to 4).

The method of mixing (A), (B) and water is not particularly restricted. In the case that (A) is highly viscous (e.g. 1 Pa·s or more) or a solid, it is possible to dissolve (A) in a solvent and purify (A) in the state of a solution. As the solvent which may be used, there may be mentioned, for example, alcohols (methanol, ethanol, isopropanol and the like), ketones (acetone, methyl ethyl ketone, methyl isobutyl ketone and the like), esters (methyl acetate, ethyl acetate, n-butyl acetate and the like) and halogen-containing solvents (chloroform, carbon tetrachloride, 1,2-dichloroethane and the like). The concentration of (A) in the case of being dissolved in a solvent is not particularly restricted provided that (B) and water may be mixed (e.g. the content of (A) in a solution of (A) is 10 to 99%), and the solution may be adjusted to an appropriate viscosity (e.g. less than 1 Pa·s) to be used. When a solvent is used, a removal of a solvent may be carried out by a method such as stripping after purification.

The mixing temperature is preferably 50 to 150° C., and more preferably 70 to 120° C. The mixing period is preferably 10 minutes to 10 hours, and more preferably 20 minutes to 2 hours. The mixing may be carried out under pressure (preferably 5 $kgf/cm^2G$ or less), if necessary.

Alkalization of the system in mixing to a pH of 7 to 14, preferably 8 to 13 makes the removal effect of a bisphenol by (B) further improved. It is possible to alkalize the system by adding the hydroxide of an alkaline metal mentioned above or an amine.

As the amine mentioned above, there may be mentioned, for example, alkylamines having 1 to 12 carbon atoms (diethylamine, triethylamine and the like) and alkanolamines having 2 to 12 carbon atoms (monoethanolamine, diethanolamine and the like).

When the mixing is completed, (B) is removed by a general filtration operation.

If aimed content of bisphenols is not achieved in one purification process mentioned above, the operation may be repeated until the aimed content is achieved.

When using the method (2), the organic solvent is preferably insoluble in water, and there may be mentioned aromatic hydrocarbons (e.g. toluene and xylene), aliphatic and alicyclic hydrocarbons (e.g. cyclohexane and n-hexane) and the like. The mixing ratio between an organic solvent and water is not particularly restricted, but preferably (1 to 9):(9 to 1), more preferably (2 to 8):(8 to 2), and particularly preferably (3 to 7):(7 to 3).

As the alkalization method, there may be mentioned a method which comprises adding the same hydroxide of the alkaline metal or the amine as in (1). The pH is preferably 8 to 13.

The standing temperature is generally 5 to 40° C., and preferably 10 to 35° C. The standing period is not particularly restricted provided that the separation can be carried out, but preferably 5 minutes to 10 hours.

Among these methods, preferred is the method (1).

The total content of aluminum, alkaline metals and alkaline earth metals in (A) after the purification process of (1) and/or (2) is preferably 2 to 75 ppm in view of long-term running ability. The lower limit of it is more preferably 5 ppm, and the upper limit of it is more preferably 60 ppm. (A) satisfying the above total content of metals can be obtained by selecting the species and the amount to be used of (B).

In the present invention, the total content of alkaline metals, alkaline earth metals and aluminum is obtained by measuring content of each metal by the following method to calculate the total content.

[Method for Measuring the Content of Alkaline Metals, Alkaline Earth Metals and Aluminum]

10 g of a sample is dissolved in 90 g of dimethylformamide (DMF) to prepare a 10% solution. This solution is measured by ICPS (Inductively Coupled Plasma Spectrometry). The concentration is calculated by using a calibration curve, prepared in advance, of concentration to area of each object metal.

As for an example of ICPS analysis equipment, there may be mentioned Shimadzu's ICPS-8000 and the like.

As other polyols used, if necessary, in the alcohol component, which is an ingredient of the polyester resin used for the present invention, there may be mentioned the diols (a) other than (A), and polyols (b) having three or more OHs.

As the diol (a), there may be mentioned alkylene glycols having 2 to 36 carbon atoms (ethylene glycol, 1,2-propylene glycol, 1,3-propylene glycol, 1,4-butanediol, 1,6-hexanediol and the like); alkylene ether glycols having 4 to 24 carbon atoms (diethylene glycol, triethylene glycol, dipropylene glycol, polyethylene glycol, polypropylene glycol, polytetramethylene ether glycol and the like); alicyclic diols having 6 to 36 carbon atoms (1,4-cyclohexanedimethanol, hydrogenated bisphenol A and the like); AO adducts of the above alicyclic diols (the number of moles of AO: 2 to 20); and the like. Two or more of these may also be used in combination.

As the above AO, those having 2 to 4 carbon atoms are preferred, and EO and/or PO are more preferred (the same applies to AO of the following compounds).

Among these, alkylene glycols having 2 to 12 carbon atoms are preferred, and ethylene glycol is particularly preferred. The hydroxyl value of (a) is preferably 180 to 1850 (mg KOH/g, the same applies to the following hydroxyl values).

As the polyols (b), there may be mentioned aliphatic polyhydric alcohols having 3 to 8 or more OHs (glycerine, trimethylolethane, trimethylolpropane, pentaerythritol, sorbitol and the like); AO adducts of the above aliphatic polyhydric alcohols (the number of moles of AO: 2 to 20); tris phenols (tris phenol PA and the like); novolac resins (phenol novolac, cresol novolac and the like; average polymerization degree of 3 to 60); AO adducts of the above tris phenols (the number of moles of AO: 2 to 20); AO adducts of the above novolac resins (the number of moles of AO: 2 to 20); and the like. Two or more of these may also be used in combination.

Among these, aliphatic polyhydric alcohols having 3 to 8 or more OHs and AO adducts of novolac resins are preferred, and AO adducts of novolac resins are particularly preferred. The hydroxyl value of (b) is preferably 150 to 1850.

Additionally, as the alcohol component, a lower alkanoate (1 to 8 carbon atoms) of the diol (a) or the polyol having three or more OHs (b) may be used.

As the acid component constituting the polyester resin, there may be mentioned dicarboxylic acids (c) and polycarboxylic acids (d) having three or more COOHs.

As the dicarboxylic acid (c), there may be mentioned alkane dicarboxylic acids having 4 to 36 carbon atoms (succinic acid, adipic acid, sebacic acid, dodecenylsuccinic acid and the like); alkene dicarboxylic acids having 4 to 36 carbon atoms (maleic acid, fumaric acid and the like); aromatic dicarboxylic acids having 8 to 36 carbon atoms (phthalic acid, isophthalic acid, telephthalic acid, naphthalene dicarboxylic acid and the like); and the like. Two or more of these may also be used in combination.

Among these, alkene dicarboxylic acids having 4 to 20 carbon atoms and aromatic dicarboxylic acids having 8 to 20 carbon atoms are preferred, and maleic acid, fumaric acid and telephthalic acid are particularly preferred. The acid value of (c) (mg KOH/g, the same applies to the following acid values) is preferably 180 to 1250.

As the polycarboxylic acid (d), polycarboxylic acids having 3 to 6 or more COOHs are preferred, and specifically, there may be mentioned aromatic polycarboxylic acids having 9 to 20 carbon atoms (trimellitic acid, pyromellitic acid and the like), vinyl polymers of unsaturated carboxylic acids (styrene/maleic acid copolymers, styrene/acrylic acid copolymers, α-olefin/maleic acid copolymers, styrene/fumaric acid copolymers and the like), and the like. Two or more of these may also be used in combination. Among these, aromatic polycarboxylic acids having 9 to 20 carbon atoms are preferred, and trimellitic acid and pyromellitic acid are particularly preferred. The acid value of (d) is preferably 150 to 800.

Additionally, as the acid component, an acid anhydride or a lower alkyl ($C_1$-$C_4$) ester (methyl ester, ethyl ester, isopropyl ester and the like) of the dicarboxylic acid (c) or the polycarboxylic acid (d) having three or more COOHs may be used. Moreover, an acid anhydride or a lower alkyl ester of a preferable carboxylic acid is similarly preferred.

Furthermore, other than (a) to (d), hydroxycarboxylic acids (hydroxystearic acid, fatty acids of hydrogenated castor oil, and the like) may also be used.

For obtaining low glossy images useful for monochrome copier and the like by using the toner binder of the present invention, comprised of the polyester resin, a nonlinear polyester constituting (A*)[which represents (A) and, if necessary, (a)] and (c), together with (b) and/or (d) is preferred, and a polyester constituting 4 components of (A*), (b), (c) and (d) is particularly preferred. By using both (b) and (d), anti-hot offset property is more improved.

Regarding the ratio of (b) and (d), the sum of the mole numbers of (b) and (d) relative to the total mole numbers of (A*) to (d) is preferably 0.1 to 40 mole %, more preferably 0.5 to 25 mole %, and particularly preferably 1 to 20 mole %. The molar ratio between (c) and (d) may be an arbitrary ratio, but preferably 90/10 to 0.20/80, and particularly preferably 85/15 to 30/70.

For obtaining high glossy images useful for full-color copiers and the like, a linear polyester constituting (A*) and (c), or a nonlinear polyester constituting (A*) and (c) and further (b) and (d) in combination is preferred.

Regarding the ratio of (b) and/or (d), the sum of the mole numbers of (b) and (d) relative to the total mole numbers of (A*) to (d) is preferably 0 to 20 mole %, more preferably 0 to 15 mole %, and particularly preferably 0 to 10 mole %.

The polyester resin for a toner binder preferably contains 0 to 70% of THF-insoluble matters. When the polyester resin is used for a monochrome copier, the content of the THF-insoluble matters is more preferably 15 to 60%, and particularly preferably 20 to 50%. More improved low temperature fixability is obtained when the content is 70% or less.

The THF-insoluble matters and THF-soluble matters are obtained by the following method.

About 0.5 g of a sample is weighed precisely and charged in a 200 ml meyer flask with a stopper. 50 ml of THF is added thereto, the mixture is stirred and refluxed for 3 hours, and then cooled. Then, insoluble matters are filtered off by a glass filter.

The weight % of the THF-insoluble matters is calculated by a weight ratio between the weight of the resin matters on the glass filter after being dried at 80° C. for 3 hours under reduced pressure and the weight of the sample.

For the after-mentioned molecular weight measurement, this filtrate (THF-soluble matters) is used.

Generally, in the polyester resin to be used for the present invention, the ratio of (A) in the total alcohol components can be arbitrarily selected, but the ratio of (A) in the alcohol components is preferably 20 mole % or more, more preferably 60 mole % or more, and particularly preferably 80 mole % or more in view of a balance among the storage stability, fixability and grindability of the toner.

The ratio of the alcohol component and the acid component, as expressed in terms of the equivalent ratio of hydroxyl groups [OH] and carboxyl groups [COOH], i.e. [OH]/[COOH], is preferably 2/1 to 1/2, more preferably 1.5/1 to 1/1.5, most preferably 1.4/1 to 1/1.4. The species of alcohol component and acid component to be used are preferably selected in view of a molecular weight, which is adjusted so that the finally prepared toner binder comprised of the polyester resin may have a glass transition point (Tg) of 40 to 90° C. (particularly 45 to 70° C.).

Additionally, in the above and the subsequent description, Tg is determined by the method (DSC method) prescribed in ASTM D3418-82 using Seiko Instruments Inc.'s DSC 20, SSC/580.

The content of unreacted bisphenols in the polyester resin is generally 15 ppm or less, preferably 10 ppm or less, more preferably 3 ppm or less, and particularly preferably the detection limit (0.1 ppm) or less. If it exceeds 15 ppm, long-term running ability becomes poor when the resin is used in toners.

The number average molecular weight (Mn) of THF-soluble matters of the polyester resin determined by gel permeation chromatography (hereinafter, abbreviated as GPC) is preferably 1,500 to 1,000,000, more preferably 2,000 to 100,000, and particularly preferably 4,000 to 50,000. The weight average molecular weight (Mw) is preferably 5,000 to 5,000,000, and more preferably 10,000 to 2,000,000. When the maximum value of the molecular weight distribution is 1,500 to 1,000,000, the thermal storage stability and powder fluidity become improved, and thus such a molecular weight is preferable.

In the above and the subsequent description, the molecular weight of the polyester resin is determined by GPC under the following conditions.

| | |
|---|---|
| Apparatus: | Tosoh HLC-8120 |
| Columns: | TSK gel GMHXL (two columns)<br>TSK gel Multipore HXL-M (one column) |
| Measurement temperature: | 40° C. |
| Sample solution: | 0.25% solution in THF |
| Solution injection size: | 100 μl |
| Detector: | Refractive index detector |
| Reference material: | Polystyrene |

The Tg of the polyester resin is preferably within the range of 40 to 90° C., and more preferably 45 to 70° C. When the Tg is within the range of 40° C. to 90° C., the thermal storage stability and low temperature fixability become improved when the resin is used in toners. The acid value of the polyester resin is preferably 0.1 to 80, and more preferably 1 to 60. The hydroxyl value of the same is preferably 0.1 to 100, and more preferably 1 to 80.

The polyester resin used for the present invention is obtained by subjecting the alcohol component ((A) and, if necessary, (a) and/or (b)) and the acid component (at least one species selected from (c), (d) and an acid anhydride or a lower alkyl ester thereof) to polycondensation in the presence of an esterifying catalyst. Also, the above alcohol component may be subjected to reaction with AO and an acid anhydride. The reaction temperature is not particularly restricted, but preferably 160 to 250° C., more preferably 175 to 240° C., and particularly preferably 185 to 230° C. By carrying out the reaction at 160 to 250° C., it becomes easy to significantly decrease bisphenol generation by thermal decomposition during the reaction.

As examples of the estrifying catalyst, there may be mentioned a tin-containing catalyst (e.g. dibutyltin oxide), a titanium-containing catalyst (tetrabutyl titanate; titanium carboxylate, such as titanium terephtalate; titanyl carboxylate salt, such as potassium titanyl oxalate; and the like).

The toner binder of the present invention may comprise other resins within such a range that the property of the polyester resin is not adversely affected together with the polyester resin, which is an essential component for the toner binder of the present invention.

As the other resins, there may be mentioned polyester resins other than those of the present invention (polyester resins not containing (A) as a constituent unit), styrene resins (styrene-alkyl (meth)acrylate copolymers, styrene-diene monomer copolymers and the like), epoxy resins (bisphenol A-epichlorohydrin addition condensates and the like), and urethane resins (diol-diisocyanate polyaddition products and the like). MW of the other resin is preferably 1,000 to 2,000,000.

Content of these other resins is preferably 0 to 80%, more preferably 0 to 49%, and particularly preferably 0 to 30% based on the weight of the toner binder.

The toner for electrophotography of the present invention comprises the toner binder of the present invention and a colorant, and if necessary, may comprise various additives such as a mold release agent, charge control agent and a flowability providing agent and the like.

As the colorant, conventional dyes, pigments and magnetic powders may be used. More specifically, there may be mentioned carbon black, Sudan Black SM, Fast Yellow G, Benzidine Yellow, Pigment Yellow, Indofast Orange, IRGAZIN Red, para-nitroaniline red, Toluidine Red, carmine FB, Pigment Orange R, Lake Red 2G, Rhodamine FB, Rhodamine B Lake, Methyl Violet B Lake, phthalocyanine blue, Pigment Blue, Brilliant Green, phthalocyanine green, Oil Yellow GG, Kayaset YG, Orasol Brown B, Oil Pink OP, magnetite, iron black and the like.

When a dye or pigment is used, content of the colorant is preferably 0.5 to 15%, and more preferably 0.6 to 10% based on the weight of the toner binder. When a magnetic powder is used, it is used preferably within the range of 20 to 150%, and more preferably 40 to 120%.

As the mold release agent, there may be mentioned waxes having a softening point of 50 to 170° C. As the waxes, there may be mentioned polyolefin resins (polyethylene, polypropylene, ethylene-α-olefin ($C_3$-$C_8$) copolymers, Fischer-Tropsch waxes, polymethylene and the like), paraffins (n-paraffin, isoparaffin and the like), ester waxes (carnauba waxes, montan waxes, rice waxes and the like), aliphatic alcohols having not less than 30 carbon atoms, fatty acids having not less than 30 carbon atoms, a mixture of these, and the like.

Content of the mold release agent in the toner is preferably 0 to 30%, and more preferably 1 to 20% based on the weight of the toner binder.

As the charge control agent, there may be mentioned, for example, nigrosine dyes, quaternary ammonium salt compounds, quaternary ammonium salt group-containing polymers, metal-containing azo dyes, salicylic acid metal salts, sulfonic acid group-containing polymers, fluorine-containing polymers and halo-substituted aromatic ring-containing polymers.

Content of the charge control agent in the toner is preferably 0 to 5% based on the weight of the toner binder.

As the flowability providing agent, those generally usable may be used such as colloidal silica, alumina powders, titanium oxide powders and calcium carbonate powders. The amount to be used is preferably 0 to 5% based on the weight of the toner binder.

Total content of these additives is preferably 0 to 40%, and more preferably 1 to 25% based on the weight of the toner binder.

The method of producing the toner of the present invention may comprise a conventional kneading and grinding method and the like. After dry blending of the toner constituents mentioned above, the mixture is melt-kneaded and then finely ground by using a jet mill or the like, followed by air classification to obtain toner particles. The particle diameter D50 is preferably 2 to 20 μm.

The toner for electrophotographiy of the present invention, if necessary after admixing with carrier particles such as an iron powder, glass beads, a nickel powder, ferrite, magnetite, and ferrite whose surface is coated with a resin (acrylic resin, silicone resin or the like), is used as an electric latent image developer. It is also possible to form electric latent images by friction with such a member as a charged blade in lieu of the use of carrier particles.

The toner is then fixed to a support (e.g. paper, polyester film or the like) by the conventional hot roller fixation method or the like to give a recorded product.

BEST MODE FOR CARRYING OUT THE INVENTION

The following examples further illustrate the present invention. They are, however, by no means limitative of the scope of the present invention. Additionally, the content of unreacted bisphenol A, and the total content of alkaline metals, alkaline earth metals and aluminum are determined by the above-mentioned method.

Evaluation of each toner was carried out by the following test methods.

(1) The Minimum Fixing Temperature (MFT), Hot Offset Occurrence Temperature (HOT), and Long-Term Running Ability A two-component developer for the test was prepared by uniformly mixing 30 parts of each toner and 800 parts of a ferrite carrier (product of Powdertech Co., Ltd., F-150).

Unfixed images developed on a commercial copier (AR 5030, product of Sharp Corp.) are fixed at a process speed of 80 mm/sec by a fixing machine prepared by modifying the fixing unit of a commercial full color printer (LBP 2160, product of Canon Inc.) so that hot roller temperature was variable. The hot roller temperature at which the residual image density after rubbing of the fixed image with a cloth pad amounted to at least 70% was recorded as the minimum fixing temperature (MFT). The temperature at which hot offset occurrence is recognized by the eye observation is recorded as the hot offset occurrence temperature (HOT). Furthermore, the long-term running ability was evaluated by visually observing the image unevenness (stains such as a black spot on the image, and hollow image dropout of a letter) when 50,000 sheets were copied using a test chart by using the above copier while supplying a toner.

| | |
|---|---|
| No image unevenness is observed | Excellent |
| Image unevenness is slightly observed | Fine |
| Image unevenness is observed to a degree that the image is slightly affected | Fair |
| Image unevenness is observed to a degree that the image is significantly affected | Poor |

(2) The Toner Fluidity

The aerated bulk density of each toner is measured with Powder Tester manufactured by Hosokawa Micron Corp., and the toner fluidity is determined based on the following standard. "Good" and better levels of toner fluidity are within a practical use range.

| Aerated bulk density | Toner fluidity |
|---|---|
| 36 g/100 ml or more: | Excellent |
| 33 to 36: | Fine |
| 30 to 33: | Good |
| 27 to 30: | Fair |
| Less than 27: | Poor |

PRODUCTION EXAMPLE 1

228 parts (1 mole) of bisphenol A and 2 parts of potassium hydroxide were charged in a stainless-steel autoclave having stirring and temperature adjustment functions, and 120 parts (2.06 moles) of PO was reacted at 100° C. for 3 hours. The obtained product was extremely viscous at room temperature. The content of unreacted bisphenol A was measured and found to be 200 ppm. To 350 parts of this product, 5.2 parts of "Kyowaad 500" (product of Kyowa Chemical Industry Co., Ltd.: $Mg_6Al_2(OH)_{16}CO_3.4H_2O$), 5.2 parts of "Kyowaad 600" (product of Kyowa Chemical Industry Co., Ltd.: $2MgO.6SiO_2.xH_2O$) and 5.2 parts of water were added, and the mixture was stirred for 30 minutes at 90° C. Then, "Kyowaad 500" and "Kyowaad 600" were removed by filtration to obtain a bisphenol A-PO (2 moles) adduct after dehydration. The content of unreacted bisphenol A in this product was 0.1 ppm. The total content of alkaline metals, alkaline earth metals and aluminum was 28 ppm.

PRODUCTION EXAMPLE 2

A reaction was carried out by the same procedure as in Production Example 1 except that 91 parts (2.06 moles) of EO was used in place of 120 parts (2.06 moles) of PO. The obtained product was a white solid at room temperature. The content of unreacted bisphenol A was measured and found to be 160 ppm. To 321 parts of this product, 5.2 parts of "Kyowaad 500", 5.2 parts of "Kyowaad 600", and 5.2 parts of water were added, and the mixture was stirred for 30 minutes at 90° C. Then, "Kyowaad 500" and "Kyowaad 600" were removed by filtration to obtain a bisphenol A-EO (2 moles) adduct after dehydration. The content of unreacted bisphenol A in this product was 0.1 ppm. The total content of alkaline metals, alkaline earth metals and aluminum was 25 ppm.

COMPARATIVE PRODUCTION EXAMPLE 1

By the same procedure as in Production Example 1, 228 parts (1 mole) of bisphenol A and 2 parts of potassium hydroxide were charged in a stainless-steel autoclave having stirring and temperature adjustment functions, and 120 parts (2.06 moles) of PO was reacted at 100° C. for 3 hours. The obtained product was extremely viscous at room temperature. The catalyst was removed by using 5.2 parts of an adsorbent (activated clay) and 2 parts of a filter aid ("Radiolite" (product of Showa Chemical Industry Co., Ltd)) to obtain a bisphenol A-PO (2 moles) adduct. The content of unreacted bisphenol A in this product was 195 ppm. The total content of alkaline metals, alkaline earth metals and aluminum was 90 ppm.

EXAMPLE 1

739 parts of the bisphenol A-PO (2 moles) adduct produced in Production Example 1, 176 parts of terephthalic acid, 78 parts of maleic anhydride and, as a condensation catalyst, 3 parts of dibutyltin oxide were charged in a reaction vessel equipped with a cooling column, a stirrer and a nitrogen inlet tube. The mixture was then subjected to reaction for 10 hours at 200° C. under nitrogen flow while removing generated water. Subsequently, the mixture was further subjected to reaction under reduced pressure of 100 mmHg, and taken out when the softening point became 104° C. to obtain a polyester toner binder (C-1).

The acid value, the hydroxyl value, Tg, Mn and Mw of (C-1) were 2, 30, 65° C., 4400 and 13000, respectively, and the content of unreacted bisphenol A of (C-1) was not more than the detection limit (0.1 ppm).

EXAMPLE 2

309 parts of the bisphenol A-PO (2 moles) adduct produced in Production Example 1, 355 parts of the bisphenol A-EO (2 moles) adduct produced in Production Example 2, 21 parts of a phenol novolac (average polymerization degree of about 5)-EO (5 moles) adduct, 121 parts of telephthalic acid, 74 parts of fumaric acid and, as a condensation catalyst, 3 parts of dibutyltin oxide were charged in a reaction vessel equipped with a cooling column, a stirrer and a nitrogen inlet tube. The mixture was subjected to reaction at 210° C. for 10 hours under nitrogen flow while removing generated water, and then further subjected to reaction under reduced pressure of 5 to 20 mmHg until the acid value became 2 or less. Then, 87 parts of trimellitic anhydride was added thereto. The mixture was subjected to reaction under normal pressure for 1 hour, subsequently under reduced pressure of 20 to 40 mmHg, and taken out when the softening point became 121° C. Thereby, a polyester toner binder (C-2) was obtained.

The acid value, the hydroxyl value, Tg, Mn and Mw of (C-2) were 30, 28, 59° C., 6200 and 20400, respectively, and the content of unreacted bisphenol A of (C-2) was not more than the detection limit.

EXAMPLE 3

500 parts of (C-1) and 500 parts of (C-2) were charged in a plastomill, stirred at 220° C. for 5 minutes to mix with melting. Thereby, a toner binder (C-3) was obtained.

The acid value, the hydroxyl value, Tg, Mw and Mn of (C-3) were 12, 27, 61.5° C., 366000 and 4400, respectively, and the content of unreacted bisphenol A of (C-3) was not more than the detection limit.

EXAMPLE 4

100 parts of the toner binder (C-1), 4 parts of cyanine blue KRO (product of Sanyo Color Works, Ltd.) and 4 parts of carnauba wax (softening point 82° C.) were mixed with melting by a twin-screw extruder (product of IKEGAI, Ltd. PCM-30). The kneaded product was cooled, coarsely ground, finely ground by using a supersonic jet mill Labo Jet (product of Nippon Pneumatic Mfg. Co., Ltd.), and classified by an airflow separator (product of Nippon Pneumatic Mfg. Co., Ltd. MDS-I) to obtain toner particles having the diameter D50 of about 9 μm. Then, 108 parts of the toner particles and 0.7 parts of a flowability providing agent (product of Nippon Aerosil Co., Ltd. Aerosil R972) were mixed (externally added) to obtain a toner (T1). Table 1 shows the evaluation results.

EXAMPLE 5

100 parts of the toner binder (C-2), 4 parts of carbon black (product of Mitsubishi Chemical Corp. MA-100) and 4 parts of Biscol 550P (softening point 150° C.; product of Sanyo Chemical Industries Ltd.) were mixed with melting by a twin-screw extruder (product of IKEGAI, Ltd. PCM-30). From the kneaded product, a toner (T2) was obtained by the same procedure as in Example 4. Table 1 shows the evaluation results.

EXAMPLE 6

100 parts of the toner binder (C-3), 4 parts of carbon black (product of Mitsubishi Chemical Corp. MA-100) and 4 parts of Sasol wax (softening point 98° C.) were mixed with melting by a twin-screw extruder (product of IKEGAI, Ltd. PCM-30). From the kneaded product, a toner for electrophotography (T3) was obtained by the same procedure as in Example 4. Table 1 shows the evaluation results.

COMPARATIVE EXAMPLE 1

A comparative toner binder (HC-1) was obtained by the same procedure as in Example 1 except that the bisphenol A-PO (2 moles) adduct produced in Comparative Production Example 1 was used in place of the bisphenol A-PO (2 moles) adduct produced in Production Example 1.

The acid value, the hydroxyl value, Tg, Mn and Mw of (HC-1) were 2, 30, 65° C., 4450 and 13000, respectively, and the content of unreacted bisphenol A of (HC-1) was 134 ppm.

COMPARATIVE EXAMPLE 2

A comparative toner (HT1) was obtained by the same procedure as in Example 4 except that (HC-1) was used in place of (C-1). Table 1 shows the evaluation results.

TABLE 1

| Toner No. | MFT (° C.) | HOT (° C.) | Toner fluidity | Long-term running ability | Content of bisphenol A (ppm) |
|---|---|---|---|---|---|
| (T1) | 120 | 200 | Excellent | Fine | Not more than detection limit |
| (T2) | 130 | 235 | Excellent | Fine | Not more than detection limit |
| (T3) | 120 | 230 | Excellent | Fine | Not more than detection limit |
| (HT1) | 120 | 200 | Excellent | Fair | 123 |

INDUSTRIAL APPLICABILITY

By using the toner binder for electrophotography of the present invention, a toner excellent in long-term running ability may be easily obtained while maintaining the properties of a polyester resin comprising an oxyalkylene ether of a bisphenol, such as a wide fixing temperature range and good fluidity. Furthermore, since the content of bisphenols, which are suspected to be an environmental burden, is very low, the effect of the toner on the environment is also small.

The invention claimed is:

1. A toner binder for electrophotography which comprises a polyester resin constituted of an alcohol component containing a polyoxyalkylene ether (A) of a bisphenol and an acid component, the content of unreacted bisphenols in said polyester resin being 15 ppm or less.

2. The toner binder for electrophotography according to claim 1, wherein the polyoxyalkylene ether (A) of a bisphenol does not contain more than 15 ppm of unreacted bisphenols.

3. The toner binder for electrophotography according to claim 1, wherein the alcohol component contains 20 to 100 mol % of the polyoxyalkylene ether (A) of a bisphenol.

4. A toner binder for electrophotography which comprises the toner binder for electrophotography according to claim 1, a colorant and, optionally, an additive.

5. The toner according to claim 4, wherein the polyoxyalkylene ether (A) of a bisphenol does not contain more than 15 ppm of unreacted bisphenols.

6. The toner according to claim 4, wherein the alcohol component contains 20 to 100 mo 1% of the polyoxyalklene ether (A) of a bisphenol.

* * * * *

UNITED STATES PATENT AND TRADEMARK OFFICE

CERTIFICATE OF CORRECTION

PATENT NO. : 7,291,435 B2
APPLICATION NO. : 10/508901
DATED : November 6, 2007
INVENTOR(S) : Takashi Yamashiro et al.

It is certified that error appears in the above-identified patent and that said Letters Patent is hereby corrected as shown below:

In Column 14, Line 38, Claim 4, “A toner binder” should read --A toner--.

In Column 14, Line 46, Claim 6, “20 to 100 mo 1%” should read --20 to 100 mol %--.

Signed and Sealed this

Twenty-ninth Day of April, 2008

JON W. DUDAS
*Director of the United States Patent and Trademark Office*